2,943,947

$Sb_2O_3$-ADDUCT OF AN ORGANIC MONOBASIC FATTY ACID TRIGLYCERIDE WITH AN ORGANIC POLYISOCYANATE COMPOSITION

Waclaw Szukiewicz, Snyder, N.Y., assignor to Allied Chemical Corporation, New York, N.Y., a corporation of New York No Drawing. Filed Dec. 1, 1958, Ser. No. 777,214

9 Claims. (Cl. 106—266)

This invention relates to adhesives and coating compositions and more particularly refers to new and improved $Sb_2O_3$-adduct of an organic monobasic fatty acid triglyceride with an organic polyisocyanate for use as superior one-can adhesives and anti-corrosion coatings in which strength (particularly bond strength), abrasion resistance, and low water absorption are of paramount importance.

Though inorganic fillers and pigments have been frequently employed with various plastic materials, the physical properties of such filled and pigmented products cannot be predicted from a knowledge of the effect of the filler or pigment in other plastics or of other fillers in the same plastic. For example, the addition of some finely divided metallic oxides to synthetic rubber (GR-S) results in decreased tensile strength whereas the incorporation of carbon black gives a product with a greatly increased tensile strength (tenfold increase).

Polyurethane products containing inorganic pigments such as ferric oxide ($Fe_2O_3$), lead oxide ($Pb_3O_4$) or titanium dioxide undergo rapid cross-linking with available isocyanate groups and consequently cannot be employed for the manufacture of "one-can" coating or adhesive compositions which are capable of being stored for months at ordinary temperatures without reacting to form a gelatinous mass. Inorganic fillers, such as aluminum powder, bentonite and graphite, also cause rapid gelation of solutions of polyurethane compositions.

An object of the present invention is to provide new compositions comprising a mixture of $Sb_2O_3$ and an adduct of an organic monobasic fatty acid triglyceride with an organic polyisocyanate, which compositions possess long pot life and are useful as adhesives possessing improved bond strength and superior resistance to chemicals and solvents. Another object of the present invention is to provide novel compositions comprising a mixture of $Sb_2O_3$ and an adduct of an organic monobasic fatty acid triglyceride with an organic polyisocyanate, which possess long pot life and are useful for producing coatings and films having superior resistance to abrasion, chemicals and solvents as well as low water absorption. Other objects and advantages of the present invention will be apparent from the following description.

My invention relates to the preparation of an $Sb_2O_3$-polyurethane resin composition having an unusual and superior combination of properties which give it exceptional utility as an adhesive, coating, and film forming composition. In particular, the invention relates to compositions which comprise a mixture of $Sb_2O_3$ and an adduct (prepolymer) of a monobasic fatty acid triglyceride having a hydroxyl number of about 50 or higher, with an organic polyisocyanate sufficient to provide from 1.5 to 4.0, preferably 1.8 to 2.5, isocyanate groups for each hydroxyl group in the glyceride, said $Sb_2O_3$ being present in the proportion of about 25% to about 300%, preferably from about 50% to about 150% by weight of the adduct. I have found that the incorporation of $Sb_2O_3$ powder into such adducts gives compositions which possess extraordinary "pot life" yet cure in the presence or absence of conventional tertiary amine accelerators to form adhesives of superior strength and films of improved resistance to solvents and chemicals. In general, the presence of much smaller proportions of $Sb_2O_3$, e.g. about 10% by weight, produces a negligible effect of little practical value, while the use of amounts substantially greater than about 300% is undesirable, since inter alia, it produces adhesives of unduly low bond strength.

The novel compositions are preferably employed with an anhydrous, inert volatile organic solvent, e.g. toluene, ethyl acetate, etc. as a thinner or diluent to provide fluid, workable mixtures, which may be applied to the surfaces to be coated; the solvent thinner is then allowed to evaporate and the residual mass is cured at ordinary or elevated temperatures. Preferably, the adduct is formed prior to mixing with $Sb_2O_3$, but alternatively the adduct forming triglyceride and polyisocyanate reactants may be incorporated into the mixture and allowed to react and form the prepolymer therein.

The amount of $Sb_2O_3$ employed to produce the new adhesive and coating compositions of the present invention may be varied widely, in part depending on the use to which the composition is to be put. In general, at least 25% by weight of the triglyceride-polyisocyanate adduct is required to produce an adhesive which is cured at room temperature in the presence of a catalyst such as a tertiary amine or metallic drier (lead naphthenate) or at a temperature of 135–200° in the absence of a catalyst. The upper limit to the amount of $Sb_2O_3$ that can be employed is governed by the loss of bond strength (or tensile strength of films), shear strength dropping markedly when more than 300% by weight based on the triglyceride-polyisocyanate adduct of $Sb_2O_3$ is incorporated. For optimum results the $Sb_2O_3$ utilized is a high grade, finely powdered antimony trioxide essentially free of the pentoxide and containing not more than 0.1% of impurities.

Suitable monobasic fatty acid triglycerides having a hydroxyl number of about 50 or higher include castor oils (which are preferred), hydrogenated castor oils, blown linseed oils and blown soya oils.

Polyisocyanates suitable for making the prepolymer include 2,4- and 2,6-tolylene diisocyanates, diphenylmethane-4,4'-diisocyanate, p- and m-phenylene diisocyanate, hexamethylene diisocyanate, 1,5-naphthalene diisocyanate, triphenylmethane-4,4',4''-triisocyanate. The preferred organic isocyanate is diphenylmethane-4,4'-diisocyanate.

The preparation of glyceride-polyisocyanate prepolymers (adducts) of the present type is well known. Preferably, they are prepared by heating a mixture of the polyol and polyisocyanate to 50–70° C. in an inert, dry atmosphere, e.g. nitrogen gas.

The more detailed practice of the invention is illustrated by the following examples in which parts given are by weight and temperature in degrees centigrade.

PREPARATION OF CASTOR OIL - DIPHENYL-METHANE-4,4'-DIISOCYANATE ADDUCT

Diphenylmethane-4,4'-diisocyanate ("Nacconate" 300, 100 parts equivalent to 0.8 NCO group) is melted in a dry atmosphere of inert gas, nitrogen and castor oil (baker's grade DB, hydroxyl number 163, 123 parts equivalent to 0.395 OH group), is added. The mixture is heated to 60–70° for about one hour, cooled to room temperature and stored in a dry atmosphere of nitrogen.

Example 1

A mixture of the castor oil-diphenylmethane-4,4'-diisocyanate adduct (50 parts of the adduct prepared above), $Sb_2O_3$ (50 parts, C.P. grade $Sb_2O_3$ powder), and anhydrous toluene (25 parts) was run in a ball mill for 48 hours. The resulting mixture has a dispersion fineness of the order of 7–8 measured on the Hegman gauge (described in August 1950 issue of The Official Digest).

For use as an adhesive to bond aluminum to aluminum the above composition can be employed without addition of a tertiary amine catalyst if the bond is cured at a temperature of 175–180° for one hour. The aluminum surfaces to be bonded are thoroughly cleaned and a thin layer of adhesive applied to each surface, an open cure of about 30 minutes is allowed before placing the coated surfaces together. The bond is cured under slight pressure for one hour at 175–180° and kept at room temperature for about 24 hours before testing the shear strength.

A similar aluminum to aluminum bond was made employing the same castor oil-diphenylmethane-4,4'-diisocyanate adduct but containing no $Sb_2O_3$ and using 1% N-ethyl diethanolamine as catalyst to promote the cure of the bond.

SHEAR STRENGTH OF ALUMINUM TO ALUMINUM BOND

|  | 24 hrs., p.s.i. | 5 days, p.s.i. | 9 days, p.s.i. |
| --- | --- | --- | --- |
| Control (1% N-ethyldiethanolamine) | 1,760 | 1,800 | 1,800 |
| $Sb_2O_3$ adhesive composition | 2,760 | 2,800 | 2,800 |

Aluminum to aluminum bonds were prepared employing as the adhesive urethane-$Sb_2O_3$ compositions, in which the amount of $Sb_2O_3$ and solvent was varied. The method of preparation was as above, the amount of each constituent in the adhesive being expressed as a percentage by weight of the total composition. The table below shows shear strength results of such bonds.

SHEAR STRENGTH OF ALUMINUM TO ALUMINUM BOND

|  | $Sb_2O_3$ | Castor Oil/ "Nacconate" 300 Adduct | Solvent | Shear Strength, p.s.i. |
| --- | --- | --- | --- | --- |
| 1 | 54 | 18 | 28 | 1,866 |
| 2 | 20 | 40 | 40 | 2,100 |
| 3 | 25 | 25 | 50 | 2,000 |
| 4 | 45.5 | 45.5 | 9 | 2,066 |
| 5 | 33⅓ | 33⅓ | 33⅓ | 2,800 |
| 6 | 40 | 40 | 20 | 3,120 |

Optimum results were obtained with the adhesive composition containing 40% by weight of $Sb_2O_3$, 40% by weight of castor oil-diphenylmethane-4,4'-diisocyanate adduct, and 20% by weight of solvent. This composition was employed to bond steel to steel and brass to brass using the same conditions as for the aluminum bonding and the shear strength of such bonds was 1920 p.s.i. for steel and 1320 p.s.i. for the brass.

Aluminum to aluminum bonds were prepared employing as the adhesive a polyol-polyisocyanate adduct containing various fillers. The adhesive compositions were obtained from a mixture of castor oil-diphenylmethane-4,4'-diisocyanate (50 parts of the adduct prepared above), anhydrous toluene solvent (50 parts) and filler (25 parts), the method of making the bond and curing conditions were the same as were employed above in Example 1. The adhesive compositions, except the one containing antimony trioxide, had a conventional tertiary amine (1% N-ethyldiethanolamine) incorporated just prior to use.

SHEAR STRENGTH OF ALUMINUM TO ALUMINUM BOND

| Filler | Bond Strength, p.s.i. |
| --- | --- |
| $Cu_2O$ | 1,200 |
| $Pb_3O_4$ | 2,140 (composition gelled rapidly) |
| $ZnO$ | 1,040 |
| Al powder | 1,080 |
| $Sb_2O_3$ | 2,100 |

Example 2

Castor oil-diphenylmethane-4,4'-diisocyanate adduct (50 parts of the product prepared for Example 1 above) was mixed in a ball mill for 48 hours with $Sb_2O_3$ (50 parts, C.P. grade $Sb_2O_3$), and anhydrous toluene (25 parts). The resulting mixture (35 parts) was diluted with anhydrous toluene (35 parts) and 1% of N-ethyldiethanolamine catalyst was added with efficient stirring. The solution was then cast on a clean mercury surface (6" x 10") and the solvent evaporated to produce a tack-free film in about 1½ hours. The cure of the film was completed by heating for one hour at 38° and two hours at 175–180°.

The tensile strength of the completely cured film was 2500 p.s.i. and the film had a high gloss. Such filled polyurethane films are resistant to abrasion, marring, organic solvents such as xylene or dichlorobenzene, and acid or base solutions.

Example 3

The diluted composition of Example 2 above was used to produce an 0.003" thick coating on glass. A similar coating on glass was produced from a castor oil/isocyanate adduct-$Sb_2O_3$-solvent mixture containing no N-ethyldiethanolamine catalyst. The drying time and Sward hardness (room temperature cure) of the coatings are compared below:

|  | Drying Time, hrs. (tack free) | Sward Hardness | | |
| --- | --- | --- | --- | --- |
|  |  | 24 hrs. | 7 days | 14 days |
| A—no catalyst present | 18 | 2 | 22 | 40 |
| B—catalyst present | 1.5 | 20 | 40 | 40 |

The coating composition after addition of catalyst has a pot life of about 72 hours.

Example 4

A grey paint suitable for industrial application to prevent corrosion of metal or steel can be obtained by incorporating a small amount of colloidal carbon into a mixture of castor oil-diphenylmethane-4,4'-diisocyanate adduct, $Sb_2O_3$ and solvents.

A mixture of castor oil-diphenylmethane-4,4'-diisocyanate adduct (60 parts, as prepared above for Example 1), $Sb_2O_3$ (60 parts), anhydrous organic solvents (38 parts of toluene and 8 parts of ethyl acetate) and colloidal carbon (0.3 part) was run in a ball mill for 48 hours. About 1% of N-ethyldiethanolamine was stirred into the solution before application to metal or steel, the paint dried to a tack-free state in about 1½ hours.

Example 5

An adhesive suitable for bonding polyvinyl chloride film or sheet to lightweight metal sheets (magnesium or aluminum) was prepared as follows:

Castor oil-diphenylmethane-4,4'-diisocyanate adduct (50 parts of the product prepared above) was mixed in a ball mill for 48 hours with $Sb_2O_3$ (50 parts, C.P. grade $Sb_2O_3$), and anhydrous toluene (25 parts). The resulting mixture (50 parts) was diluted with anhydrous ethyl acetate (50 parts); this solution can be stored under an atmosphere of nitrogen for at least three months.

The adhesive solution was applied to the surfaces to be bonded, an open cure of from 8 to 12 minutes is usual. The coated magnesium metal sheet was flash-heated to 60–65° for 30 to 40 seconds, the coated polyvinyl chloride film was heated to 135° for 10 to 15 seconds and the two surfaces were brought into contact applying sufficient pressure to insure good contact. After a period of four to seven days the strength of the bond is generally greater than the tear strength of the polyvinyl chloride film.

Employing embossed polyvinyl chloride film such as is used for the manufacture of lightweight luggage, the following peel strengths, after aging, were obtained for bonding to magnesium sheets. (Peel strength is measured as the weight, in pounds, required to separate a one inch wide strip of the two layers at a rate of one inch per minute.)

| Aging time (hours) | Peel strength (lbs.) |
|---|---|
| 24 | 4½–8 |
| 48 | 10 –11½ |
| 72 | 11 –14½ |
| 96 | 12 –16 |
| 7 days | 12 –16 |

Maximum strength of the bond is usually obtained in about four days.

Example 6

Steel probes were dip coated with a castor oil-diphenylmethane-4,4'-diisocyanate adduct-$Sb_2O_3$-toluene composition (50 parts adduct, 50 parts $Sb_2O_3$ and 75 parts toluene), and a control set of steel probes were coated with a castor oil-diphenylmethane-4-4'-diisocyanate adduct in toluene. To both coating compositions lead naphthenate catalyst was added just before use. Sets of the coated probes were immersed in organic solvents (xylene, trichlorobenzene) at 90°. The coatings containing $Sb_2O_3$ were about 0.006 inch thick, whereas the control coatings (containing no $Sb_2O_3$) were about 0.01 inch. The castor oil-isocyanate adduct-$Sb_2O_3$ coatings were unaffected after 1600 hours' immersion in organic solvents at 90° whereas the castor oil/isocyanate adduct coatings (containing no $Sb_2O_3$) could be easily peeled off after 570 hours' immersion at 90°. The $Sb_2O_3$ containing coatings were unchanged after one month's immersion in 50% sulfuric acid at room temperature.

Although certain preferred embodiments of the invention have been disclosed for purpose of illustration, it will be evident that various changes and modifications may be made therein without departing from the scope and spirit of the invention.

I claim:

1. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.5 to 4.0 isocyanate groups for each hydroxyl group in the glyceride, said $Sb_2O_3$ being present in the proportion of about 25% to about 300% by weight of the adduct.

2. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.8 to 2.5 isocyanate groups for each hydroxyl group in the glyceride, said $Sb_2O_3$ being present in the proportion of about 50% to about 150% by weight of the adduct.

3. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.5 to 4.0 isocyanate groups for each hydroxyl group in the glyceride, said $Sb_2O_3$ being present in the proportion of about 25% to about 300% by weight of the adduct, and an anhydrous, inert volatile organic solvent.

4. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.8 to 2.5 isocyanate groups for each hydroxyl group in the glyceride, said $Sb_2O_3$ being present in the proportion of about 50% to about 150% by weight of the adduct, and an anhydrous, inert volatile organic solvent.

5. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.8 to 2.5 isocyanate groups for each hydroxyl group in the glyceride, said $Sb_2O_3$ being present in the proportion of about 50% to about 150% by weight of the adduct, and a small amount of catalyst to promote curing of the composition.

6. A composition adapted for use in the production of adhesives, coatings and films consisting essentially of a mixture of $Sb_2O_3$ and an adduct of a monobasic fatty acid triglyceride having a hydroxyl number above about 50 with an organic polyisocyanate sufficient to provide from 1.5 to 4.0 isocyanate groups for each hydroxyl group in the glyceride, said $Sb_2O_3$ being present in the proportion of about 25% to about 300% by weight of the adduct, an anhydrous, inert volatile organic solvent, and a small amount of catalyst to promote curing of the composition.

7. A composition adapted for use in the production of adhesives, coatings and films consisting essentially of a mixture of $Sb_2O_3$ and an adduct of castor oil with diphenylmethane-4,4'-diisocyanate sufficient to provide from 1.8 to 2.5 isocyanate groups for each hydroxyl group in the glyceride, said $Sb_2O_3$ being present in the proportion of about 50% to about 150% by weight of the adduct.

8. A composition adapted for use in the production of adhesives, coatings and films consisting essentially of a mixture of $Sb_2O_3$ and an adduct of castor oil with diphenylmethane-4,4'-diisocyanate sufficient to provide from 1.8 to 2.5 isocyanate groups for each hydroxyl group in the glyceride, said $Sb_2O_3$ being present in the proportion of about 50% to about 150% by weight of the adduct, and anhydrous toluene as a solvent.

9. A composition adapted for use in the production of adhesives, coatings and films consisting essentially of a mixture of $Sb_2O_3$ and an adduct of castor oil with diphenylmethane-4,4'-diisocyanate sufficient to provide from 1.8 to 2.5 isocyanate groups for each hydroxyl group in the glyceride, said $Sb_2O_3$ being present in the proportion of about 50% to about 150% by weight of the adduct, anhydrous toluene as a solvent, and a tertiary amine catalyst to promote the cure of the composition.

References Cited in the file of this patent

UNITED STATES PATENTS

| | | |
|---|---|---|
| 2,075,543 | Reed | Mar. 30, 1937 |
| 2,769,826 | Yoho | Nov. 6, 1956 |
| 2,787,601 | Detrick | Apr. 2, 1957 |
| 2,886,455 | Doggett | May 12, 1959 |

OTHER REFERENCES

"Properties of Urethane Oils," The Chemical Age, Mar. 31, 1951, pages 481–484.